United States Patent

Kemnitz et al.

[11] Patent Number: 6,026,777
[45] Date of Patent: Feb. 22, 2000

[54] PISTON HAVING A BARREL OF FORGED STEEL AND A COOLING CHANNEL

[75] Inventors: Peter Kemnitz, Leutenbach; Michael Ullrich, Mölingen, both of Germany

[73] Assignee: Mahle GmbH, Stuttgart, Germany

[21] Appl. No.: 09/234,750

[22] Filed: Jan. 21, 1999

[30] Foreign Application Priority Data

Oct. 7, 1998 [DE] Germany ............. 198 46 152

[51] Int. Cl.⁷ ..................... F02F 3/00
[52] U.S. Cl. ..................... 123/193.6
[58] Field of Search ............. 123/193.6; 92/222, 92/231, 260

[56] References Cited

U.S. PATENT DOCUMENTS

| | | | |
|---|---|---|---|
| 4,356,800 | 11/1982 | Moebus | 123/193.6 |
| 4,517,930 | 5/1985 | Nakano et al. | 123/193.6 |
| 4,581,983 | 4/1986 | Moebus | 92/222 |
| 4,662,319 | 5/1987 | Ayoul | 123/193.6 |
| 5,144,923 | 9/1992 | Leites et al. | 123/193.6 |
| 5,309,818 | 5/1994 | Mendes | |
| 5,778,533 | 7/1998 | Kemnitz | 123/193.6 |
| 5,778,846 | 7/1998 | Meilke | 123/193.6 |

FOREIGN PATENT DOCUMENTS

| | | |
|---|---|---|
| 24 34 902 | 2/1975 | Germany . |
| 3032671 | 3/1982 | Germany . |
| 2269808 | 10/1982 | Germany . |
| 44 46 726 | 6/1996 | Germany . |
| WO 80/02308 | 10/1980 | WIPO . |
| WO 96/22459 | 7/1996 | WIPO . |

*Primary Examiner*—Marguerite McMahon
*Attorney, Agent, or Firm*—Collard & Roe, PC

[57] ABSTRACT

A piston with a cooling channel having a basic piston barrel made from forged steel and a box-shaped shaft, bosses and boss supports and connecting walls between the boss supports as well as a combustion trough. The piston increases the rigidity of the ring part. To accomplish this, the piston has a wall extending all around above the boss bores. A structural component is welded in between the wall and the piston head and limits the cooling channel. This design increases the rigidity of the ring part in pistons.

1 Claim, 2 Drawing Sheets

PISTON HAVING A BARREL OF FORGED STEEL AND A COOLING CHANNEL

BACKGROUND OF THE INVENTION

1. Field of the Invention

The present invention relates to piston with a basic piston barrel of forged steel and a cooling channel. In particular, this invention relates to a piston in which deformation in the region of the ring band is minimized.

2. The Prior Art

This type of a piston and a process for its manufacture are known from German Patent No. 44 46 726 A1. However, the piston shown in this patent has the drawback that the ring band is tied to the basic piston barrel only via the piston head. Thus, the ring band is consequently susceptible to deformation.

A piston made of cast iron is known from PCT Application WO 80/02308, where the top part and the boss part are welded together. This piston has a rib extending all around above the bosses; however, this rib is not welded to the top part and has no stiffening function.

Another piston of this type is shown in German Patent No. DE 24 34 902 A, where sections of the ring band and a radially outward section of the piston head are formed by a welded-in component. This measure, however, exclusively forms a cooling channel. This is a problem which has been solved already in the relevant state of the art by closing the machined cooling channel with a metal sheet.

Another piston is shown in German Patent No. DE 30 32 671 A, where a top part made of heat-resistant steel and a bottom part made of flow-pressed steel are welded together.

SUMMARY OF THE INVENTION

It is an object of the present invention to minimize deformation in the region of the ring band of pistons of this type.

This and other objects of the invention are achieved by a piston comprising a basic piston barrel made of forged steel having a carbon equivalent of at least 0.3% and having a box-shaped shaft. There are a cooling channel and bosses with boss bores and boss supports formed in the piston barrel. The boss supports have connecting walls between them. There is a wall extending all around the piston barrel and disposed axially above the boss bores. The wall extends radially outside of the boss supports and the connecting walls and is integrally formed with the basic piston barrel. There is a combustion trough formed in the piston barrel.

In the piston according to the invention, at least part of the ring band and piston head are formed by a structural component which is welded to the basic barrel of the piston by two welding seams. The rigidity of the ring section is therefore distinctly increased. The structural part forms at least part of a ring band and part of a piston head disposed outwardly radially on the piston barrel. The welding seams are produced by MIG-welding, MAG-welding, laser welding or electron beam welding. The wall of the basic piston barrel and the structural component jointly form a radially outer and axially lower limiting wall of the cooling channel, resulting in a bending-resistant zone in the region of the ring band.

In a preferred embodiment, there is an elastic metal sheet in the interior of the piston, which forms a lower limitation of an inner cooling space. The metal sheet is fixed in the region of the boss support by its own initial stress.

The box-shaped shaft can be separated from the ring band either by a recess in the pressure/counter-pressure direction as shown in the drawings, or it can be connected with the ring band and the surrounding wall.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
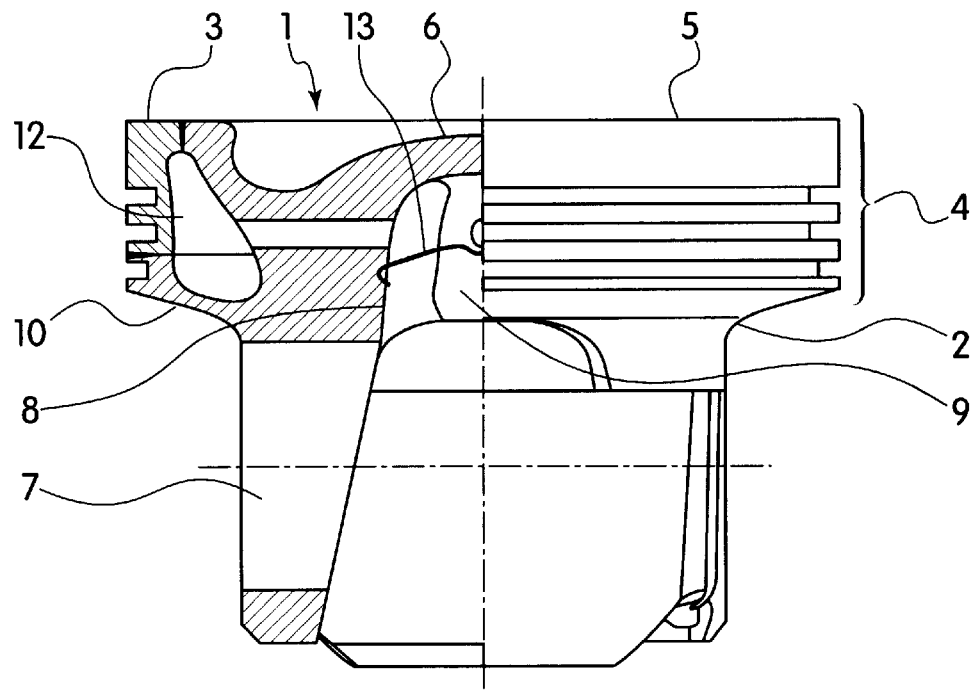
FIG. 1 shows a partial cross-sectional view of a piston as defined by the invention.
Figure 2:
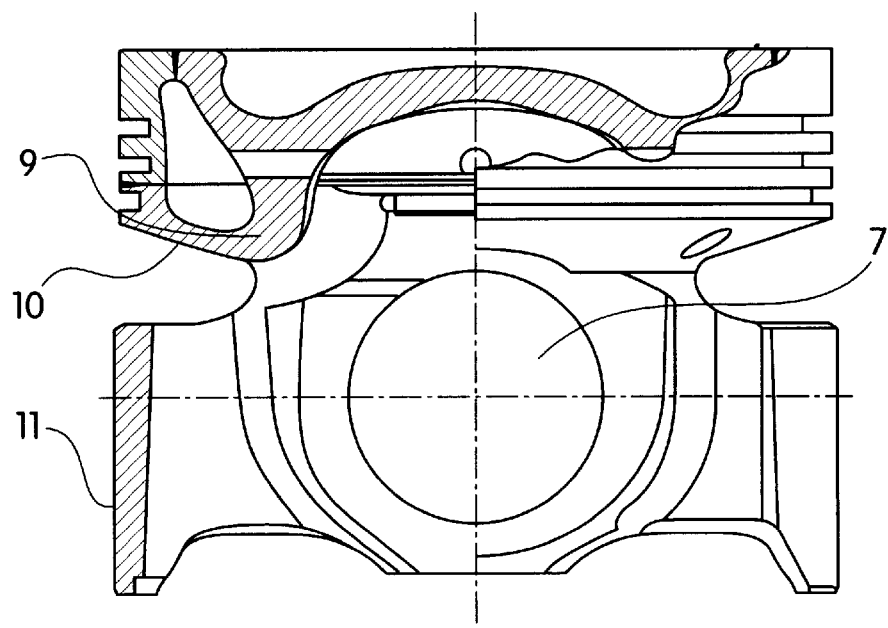
FIG. 2 shows a different cross-sectional view of the piston shown in FIG. 1.
Figure 3:
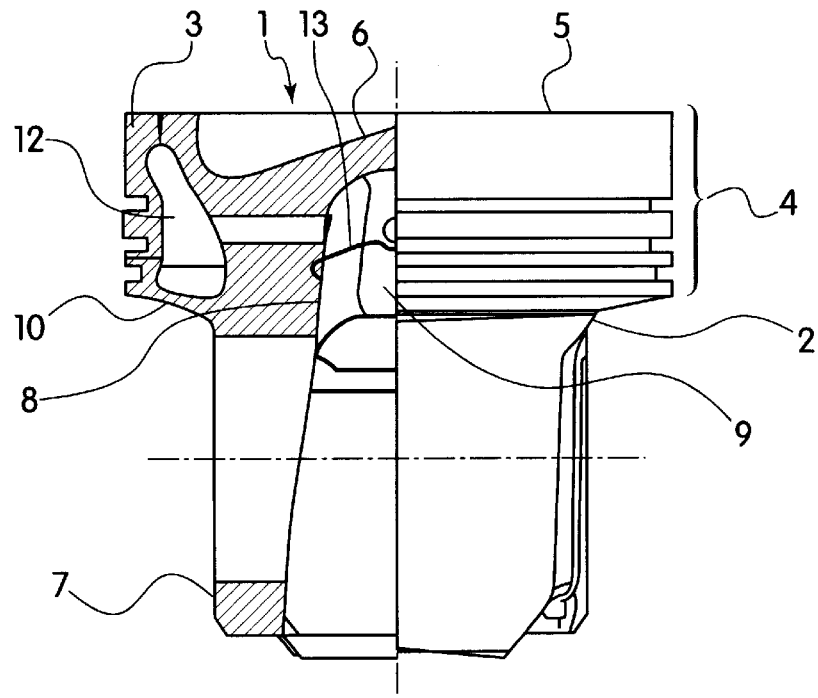
FIG. 3 shows a partial cross-sectional view of another embodiment of the piston as defined by the invention.
Figure 4:
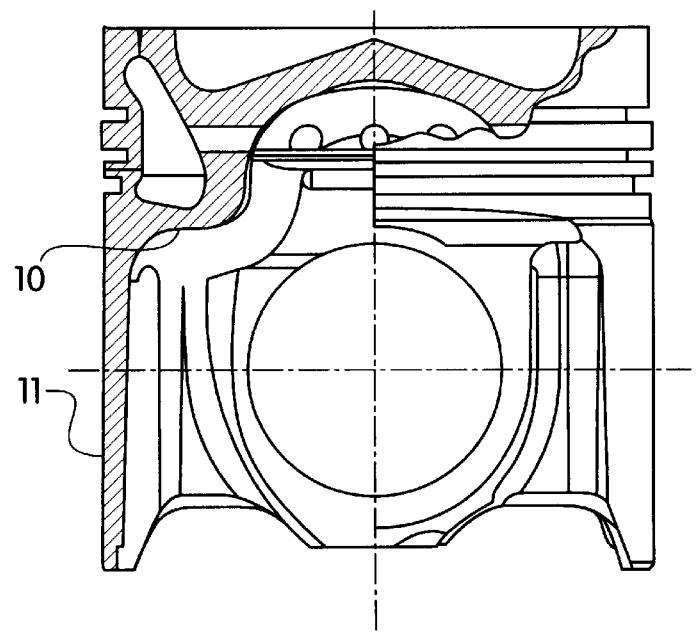
FIG. 4 shows a different cross-sectional view of the embodiment shown in FIG. 3.

Referring in detail to the drawings, FIGS. 1–4 show piston 1, which consists of a basic piston barrel 2 and a structural component 3 welded to barrel 2. Component 3 comprises part of the ring section and the piston land as well as part of piston head 5. The ring portion and the piston land are jointly denoted by reference numeral 4. A combustion trough 6 is arranged in piston head 5. The basic piston barrel consists of the bosses, which have a boss bore 7, boss supports 8 and connecting walls 9 between the bosses. There is a wall 10 shaped by molding above boss bores 7 and extending all around and radially disposed outside of the bosses and the connecting walls 9 between the bosses. There is also a well as piston head 5 with combustion trough 6.

Wall 10, which runs all around, starts to extend from the bosses or connecting walls between the boss supports and runs upwardly and is slanted radially to the outside.

The welding seams are in the form of an axial seam in the outer region of the piston head, and in the form of a radial seam in the region of the ring band between the second and third grooves.

The box-shaped shaft 11 can be connected either only to the bosses or also with ring band 4.

Wall 10 substantially forms a lower limitation of a cooling channel 12, and the welded-in structural component 3 substantially forms a radially outer limitation of cooling channel 12.

There is an elastic metal sheet 13 in the interior of the piston, which forms a lower limitation of an inner cooling space. Metal sheet 13 is fixed in the region of boss support 8 by its own initial stress.

Accordingly, while only a few embodiments of the present invention have been shown and described, it is to be understood that many changes and modifications may be made thereunto without departing from the spirit and scope of the invention as defined in the appended claims.

What is claimed is:

1. A piston comprising:

a piston barrel made of forged steel having a carbon equivalent of at least 0.3% and having a box shaped shaft;

a cooling channel formed in the piston barrel;

bosses with boss bores and boss supports formed in the piston barrel;

connecting walls between the boss supports;

a wall extending all around the piston barrel and disposed axially above the boss bores, said wall extending radially outside of the boss supports and the connecting walls, said wall being integrally formed with the basic piston barrel;

an elastic metal sheet in the interior of the piston, said sheet forming a lower limitation of an inner cooling space, said metal sheet being fixed in the region of the boss support by its own initial stress;

a combustion trough formed in the piston barrel; and a structural component welded to the piston barrel and forming at least part of a ring band and part of a piston head disposed outwardly radially on the piston barrel, wherein the welding seams are produced by a process selected from the group consisting of MIG-welding process, MAG-welding process, laser welding and electron beam welding;

wherein the wall of the piston barrel and the structural component jointly form a radially outer and axially lower limiting wall of the cooling channel, resulting in a bending-resistant zone in the region of the ring band.

* * * * *